United States Patent
Ben-Arie (10) Patent No.: US 10,575,668 B2
(45) Date of Patent: Mar. 3, 2020

(54) CONDIMENT DISPENSER IX

(71) Applicant: Jezekiel Ben-Arie, Carlsbad, CA (US)

(72) Inventor: Jezekiel Ben-Arie, Carlsbad, CA (US)

(*) Notice: Subject to any disclaimer, the term of this patent is extended or adjusted under 35 U.S.C. 154(b) by 0 days.

(21) Appl. No.: 16/159,721

(22) Filed: Oct. 15, 2018

(65) Prior Publication Data
US 2019/0133352 A1 May 9, 2019

Related U.S. Application Data

(60) Provisional application No. 62/583,519, filed on Nov. 9, 2017.

(51) Int. Cl.
*A47G 19/34* (2006.01)
*A47G 19/24* (2006.01)
*A47G 19/18* (2006.01)

(52) U.S. Cl.
CPC .......... *A47G 19/34* (2013.01); *A47G 19/183* (2013.01); *A47G 19/24* (2013.01); *A47G 2200/06* (2013.01)

(58) Field of Classification Search
CPC ................. A47G 19/24; A47G 19/34
See application file for complete search history.

(56) References Cited

U.S. PATENT DOCUMENTS

| | | | | |
|---|---|---|---|---|
| 3,276,637 A * | 10/1966 | Fender | ..................... | A47K 5/10 222/345 |
| 4,516,701 A * | 5/1985 | Tribble | .................. | A47G 19/34 222/361 |
| 4,964,546 A * | 10/1990 | Morrow | ................. | A47G 19/34 222/352 |
| 5,174,470 A * | 12/1992 | North | .................. | A47J 37/1228 221/150 HC |
| 6,131,765 A * | 10/2000 | Barry | ..................... | A47F 1/035 221/264 |
| 9,591,943 B2 * | 3/2017 | Murray | ................. | A47J 31/404 |
| 2013/0263781 A1 * | 10/2013 | Redler | .................... | G01F 11/46 118/712 |

\* cited by examiner

*Primary Examiner* — Ryan A Reis (57) ABSTRACT

A condiment dispenser with a dispensing mechanism that automatically loosens condiment coagulation in the condiment container. The user can accurately control the amount of condiment sprinkled on the food because the dispenser dispenses substantially constant amount of condiment for each manual activation. In order to isolate the stored condiment and prevent it from accumulating atmospheric moisture, only the dispensed amounts of condiment are exposed by applying a novel dispensing method of loading measured condiment portions inside the storage, transferring them, unloading and spreading them outside. The dispensing mechanism seldom clogs since it employs wide cavities for measurement, transferring, unloading and spreading.

The condiment dispenser has a simple structure which is inexpensive to manufacture. It can be held and operated using just one hand and it dispenses the condiment directly downwards without needing to downturn the dispenser. The dispenser also has an electrically motorized version.

13 Claims, 6 Drawing Sheets

CONDIMENT DISPENSER IX

CROSS-REFERENCE TO RELATED APPLICATIONS

This Application claims priority from a Provisional Patent Application Ser. No. 62/583,519 filed on Nov. 11, 2017

FEDERALLY SPONSORED RESEARCH

Not Applicable.

SEQUENCE LISTING OR PROGRAM

Not Applicable.

TECHNICAL FIELD

The present invention relates to condiment dispensers.

PRIOR ART

Many devices were invented for dispensing particulate condiments such as salt and pepper. However the operation of a large majority of them is based on shaking the container and ejecting the condiment particulates via a set of small apertures. The purpose of shaking is to accelerate the particulates in the container forwards and backwards. The forwards acceleration is converted into inertial forces forwards when the container is abruptly accelerated in the reverse direction. These inertial forces push and eject the particulates through a set of apertures whence due to gravity they fall on the food below.

However, condiments and especially salt are naturally hygroscopic and have a tendency to accumulate atmospheric moisture which causes them to coagulate both within the container and also at its apertures. Several salt dispensers such as U.S. Pat. No. 1,773,720 to All and propose means for loosening coagulated salt but loosening coagulated salt or other condiments still requires also to actively push them outside through the apertures. Shaking does not generate enough force to propel moist condiment particulates which tend to adhere to one another and to the walls of the container. Thus, one needs to apply additional propelling mechanism in order to achieve efficient dispensing. In our patent search, we could not find salt or other condiment dispensers with efficient means for pushing and ejecting salt or other condiments.

BRIEF SUMMARY OF THE INVENTION

We have several goals in inventing and developing our Condiment Dispenser IX of which some feasible embodiments are illustrated in FIGS. 1-6:
1. To develop a condiment dispenser with a dispensing mechanism that loosens condiment coagulation in the condiment container and actively transfers measured portions of the condiment stored in the condiment container and dispenses them outside on the food.
2. To develop a condiment container with a dispensing mechanism that can be held and operated manually using just one hand. It is also advantageous if the dispenser dispenses the condiment directly downwards without needing to downturn the dispenser.
3. To develop a dispensing mechanism that dispenses substantially the same amount of condiment for each manual activation. By this manner, the user can accurately control the amount of condiment sprinkled on the food.
4. To develop condiment dispenser with a dispensing mechanism which effectively isolates the condiment stored in the container from the surrounding atmosphere and thus prevents accumulation of atmospheric moisture in the condiment. In order to achieve this goal, the dispensing mechanism exposes only the dispensed amounts of condiment.

In order to achieve the objectives listed above, our condiment dispensing mechanism adopts the operational process of loading measured portions of condiment inside the condiment container, transferring these portions outside the container and finally unloading and spreading them outside. We find that other prevalent condiment dispensers dispense their condiments via open apertures which are exposing their condiment containers to the environment. This prevalent approach does not prevent natural accumulation of moisture in hygroscopic condiments, which causes excessive condiment coagulation and aperture blockage by moist and sticky condiment. In contrast, our dispensing mechanism minimizes condiment coagulation by isolating the condiment container from the environment all the time and does not employ aperture dispensing. In order to avoid dispensing via apertures we employ a sliding member which loads and transfers measured condiment portions from the condiment container to the recipient outside. By our approach, the sliding motion of the sliding section in the container also loosens the coagulation of the condiment in the container while loading measured condiment amounts into hollow cavities in the sliding section. Next, the sliding section of the transferring member transfers these measured condiment amounts outside and spreads them there.

In order to achieve air tight isolation of the condiment container from the environment, both the sliding section and the propelling section of the transferring member, which slide via the output opening and the propelling opening respectively, are configured to have air tight fit (snug fit). This requirement entails that all the surfaces of the sliding section, the propelling section and the output opening and the propelling opening need to be excessively smooth and planar. To enable condiment loading and transferring, the sliding section is required to have at least one cavity connected with an upper aperture at its upper sliding surface and connected to a lower aperture at its lower sliding surface.

Condiment loading in the sliding section is feasible when the sliding section cavities are situated in the condiment container. At this position, the sliding section is covered with condiment because it is configured to reside at the bottom of the container. At the bottom of the container the sliding section is covered with condiment as long as condiment is left in the container. Due to gravity, the condiment on top of the cavities drops into the cavities via the upper apertures and fills them since their lower openings is blocked by the container floor. At this point, the user can transfer outside the loaded cavities by propelling forwards the propelling section which propels in turn the sliding section forwards until the cavities move outside the container. When the loaded cavities are outside the frontal wall, the cavities' lower apertures opens and their condiment loads drops out, thus spreading the condiment downwards.

The condiment dispenser comprises of a condiment container comprising: a storage space filled with the condiment. The storage space is confined within: a bottom wall situated at a bottom side of the storage space, a top wall situated at a top side of the storage space, a frontal wall, a rear wall, a left wall and a right wall; The condiment dispenser further comprising: a transferring member made of solid material and comprising: a sliding section coupled with a propelling section. The sliding section comprising an upper sliding surface and a lower sliding surface, which are smooth. The sliding section also could be rectangular with planar lower and upper sliding surfaces. The sliding section includes at least one cavity which is connected to an upper aperture situated at the upper sliding surface and also connected to a lower aperture situated at the lower sliding surface. It is advisable to configure the cavity and its upper and lower opening to posses equal cross sections in order to avoid accumulation of residual condiment in the cavity. It is also advisable to configure cavities with large cross sections in order to facilitate condiment loading and unloading.

The condiment container also comprises an input opening and an output opening. The input opening is situated at the top side of the container and is configured to facilitate supplementation of the condiment container with the condiment.

The output opening is constructed at the frontal wall and is configured to have air tight and snug fit with the sliding section. Air tight fit prevents exposing the condiment to humidity. The sliding section is configured to slide via the output opening inside and outside of the condiment container when propelled by the propelling section. The sliding section slides outside when propelled forwards and inside when propelled backwards.

Due to gravity, which pulls the condiment downwards, the condiment is configured to drop into and load the cavity via the upper aperture when the sliding section is situated such that the upper aperture is inside the condiment container and is covered with condiment. Also due to gravity, the condiment loaded in the cavity is configured to drop down and out of the cavity via the lower aperture when the sliding section moves the lower aperture outside the condiment container. When the sliding section is inside the container, the lower aperture is blocked by the bottom floor of the container and the condiment is unable to drop down. When the sliding section slides outside, the lower aperture is uncovered and the condiment drops down.

To summarize, the condiment dispenser loads, transfers and dispenses the condiment when the sliding section moves the cavity inside and outside the condiment container respectively.

The condiment dispenser includes also a propelling opening which is constructed at the rear wall, situated opposite to the output opening. Similar to the output opening the propelling opening is configured to have air tight and snug fit to the propelling section. The propelling section has an upper propelling surface and a lower propelling surface, which are smooth and could be planar if one uses a rectangular propelling section. The propelling section is configured to slide via the propelling opening and to propel both the forwards and backwards sliding motions of the sliding section via the sliding opening. The bottom wall of the container has an upper bottom surface (i.e. the container's floor) which is configured to be planar and smooth because the lower sliding surface is configured to slide on top of the upper bottom surface. By this way the sliding section resides at the lowest level of the condiment container and it is covered with condiment as long as there is some condiment left in the container.

For manual operation, the propelling section is propelled by a user that can dispense condiment by propelling the propelling section in alternate forwards and backwards motions, which situate the cavity inside and outside the condiment container. To facilitate manual operation, the propelling section is equipped with a compression spring which retrieves backwards the propelling section after the propelling section was pushed forwards by the user. The spring is configured to help the user to move backwards the transferring member after the user pushed it forwards.

There is also a motorized option wherein the condiment dispenser is equipped with an electrical power source and an activation switch, which electrically connects the electrical power source to an electric propelling unit which includes an electric motor mechanically connected to a propelling mechanism which is configured to convert the electric motor rotation into alternate forwards and backwards motions which propel the propelling section forwards and backwards. Thus, by activating the activation switch the user can dispense condiment with the dispenser.

The input opening includes a door rotatably installed on a hinge at the input opening. The door is configured to open or close the input opening. The door facilitates supplementing the condiment container when the door is opened. The door seals the condiment container when the door is closed. The door includes a door handle configured to facilitate manual door opening and closing. The hinge is configured to facilitate door turning for opening and closing. The input opening also includes a door stopper, which configured to adjust door closing position.

One structural option is to configure the left wall and the right wall planar, vertical and parallel. This creates a channel with equal width. It is useful to make the sliding and propelling sections with a sliding width which is configured to occupy the whole space between the left wall and the right wall. By this configuration, the condiment is prevented from dropping into the left and right sides of the transferring member.

Another optional feature of the dispenser, is to construct a bottom wall which includes a channel that is configured to accept a pin which is screwed at the propelling lower surface. The pin is configured to travel in the channel along with the propelling section. The pin and the channel are designed to prevent the propelling section from exceeding a maximal backwards position and a maximal forwards position.

In yet another option, the rear wall is installed in a diagonally leaning backwards orientation in order to facilitate funneling the condiment and concentrating it on top of a narrow lateral strip of the upper sliding surface. Whereby facilitating more efficient condiment loading into the cavity.

In yet another optional feature, the transferring member is designed to have a shape of a rectangular bar, where the sliding section and the propelling section have the same rectangular cross section. This simplifies the manufacturing and operation of the dispenser.

DETAILED DESCRIPTION OF THE DRAWINGS

Figure 1:
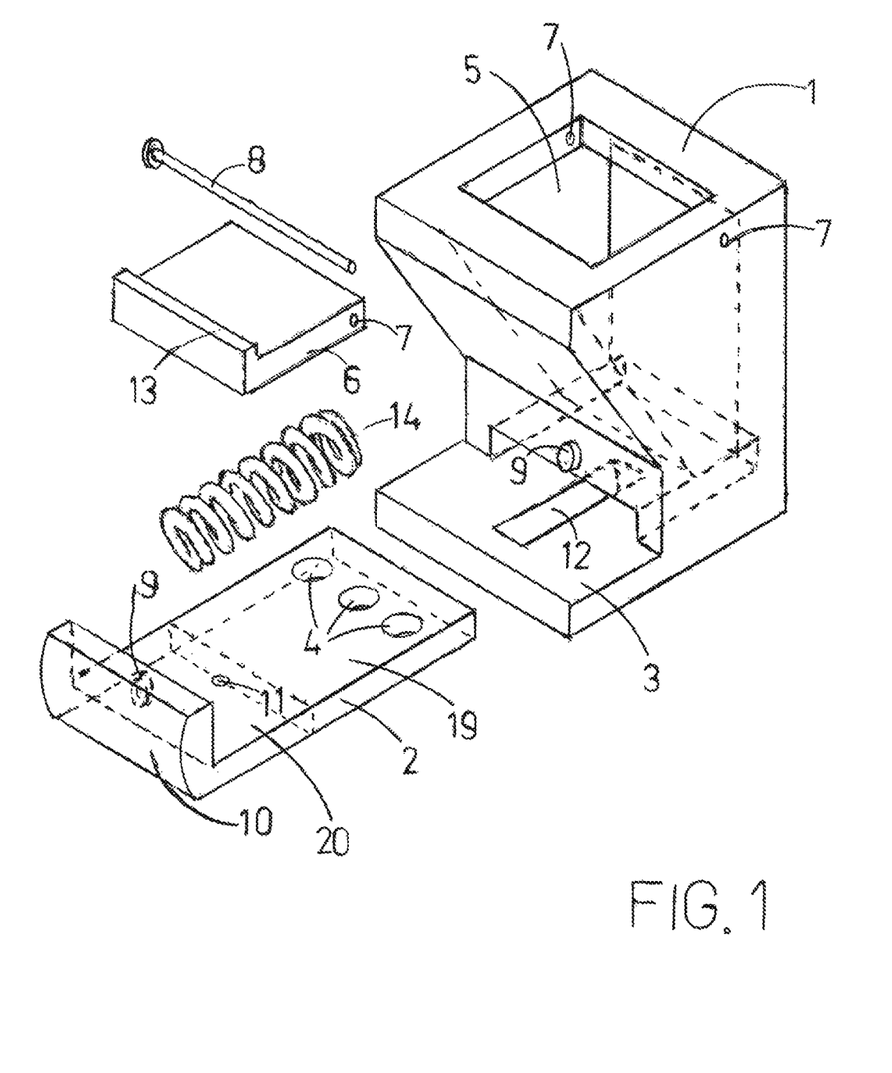
FIG. 1 illustrates a blow up isometric drawing of an embodiment of a manual condiment dispenser drawing.

FIG. 1 illustrates a blow up isometric drawing of an embodiment of a manual condiment dispenser. The condiment dispenser 1 has a bottom wall 3 with a channel 12 which is configured to limit the travel of the transferring member 2 to maximal forwards and backwards positions. The transferring member 2 is divided into a sliding section 19 and a propelling section 20 which includes also the pressing button 10 which is used for manual operation. When the user presses on the pressing button 10 the propelling section 20 moves forward (i.e. to the right) and propels the sliding section to move also to the right. The transferring member 2 moves into the condiment container 5 via the propelling opening 24 and exits via the output opening 25. In FIG. 1 the sliding section 19 has 3 cavities 4 which are loaded when they reside in the condiment container 5. The cavities 4 are unloaded when they reside outside i.e. beyond the output opening 25. The compression spring 14 which is installed between the protrusions 9 is used to push and retrieve backwards (i.e. to the left) the propelling section 20 after the user pushed the propelling section 20 forwards by manually pressing the push button 10. The container 5 is supplemented with the condiment via the input opening 26 which resides between the hinge apertures 7 which are used for hinge 8 installation. The hinge 8 is used as a fulcrum for the door 6 which is installed in the input opening 26. The door handle 13 facilitates opening the door 6.

Figure 2:
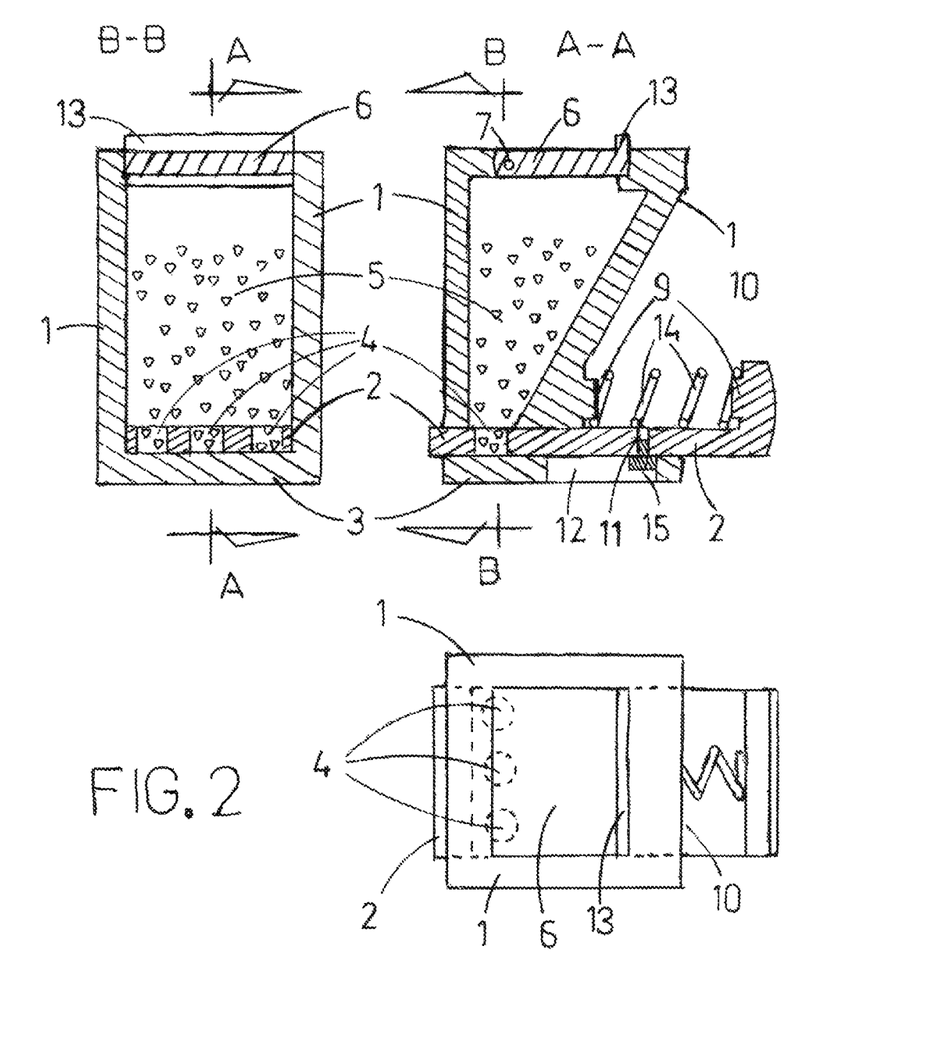
FIG. 2 Describes 3 views of an embodiment of a cross sectioned manual condiment dispenser with the transferring member in condiment loading position.

FIG. 2 Describes 3 views of a cross sectioned an embodiment of a manual condiment dispenser 1 with the transferring member 2 in condiment loading position. The condiment dispenser 1 has a bottom wall 3 with a channel 12 in which the pin 15 travels. The pin 15 which is screwed to the transferring member 2 in aperture 11 (shown in FIG. 1) is used to limit the travel of the transferring member 2 to maximal forwards and backwards positions. The transferring member 2 is divided into the sliding section 19 and the propelling section 20 which includes also the pressing button 10 which is used for manual operation. When the user presses on the pressing button 10 the transferring member 2 moves forward (i.e. to the left) and moves also the cavities 4 to the left. The transferring member 2 moves into the condiment container 5 via propelling opening 24 and exits via output opening 25. In FIG. 2 the sliding section 19 has 3 cavities 4 which are loaded when they reside in the condiment container 5. Cavities 4 become unloaded as soon as they are moved outside i.e. beyond the output opening 25. FIG. 2 shows the 3 cavities 4 in a loading position where they are filled with condiment. The compression spring 14 which is installed between the protrusions 9 is used to push backwards (i.e. to the right) the transferring member 2 after the user pushed the transferring member 2 forwards by pressing the push button 10. The container 5 is supplemented with the condiment via the input opening 26 which is covered by the door 6 in FIG. 2. Hinge apertures 7 which are used for installation of the hinge 8 (shown in FIGS. 1 and 6). The hinge 8 is used as a fulcrum for the door 6 which is installed in the input opening 26. The door handle 13 is used to open the door 6.

Figure 3:
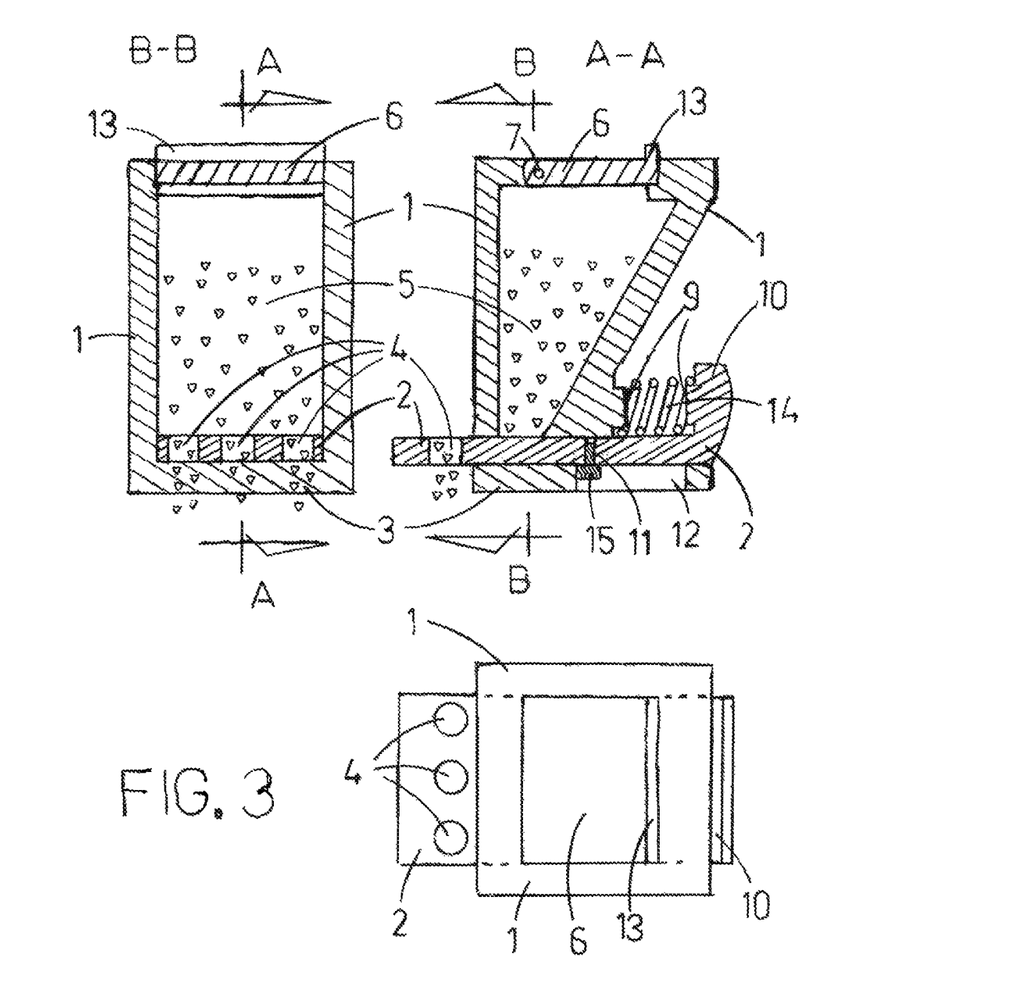
FIG. 3 Depicts 3 views of a cross sectioned of an embodiment of a manual condiment dispenser with the transferring member in condiment unloading position.

FIG. 3 Depicts 3 views of a cross sectioned an embodiment of a manual condiment dispenser 1 with the transferring member 2 in condiment unloading position. The condiment dispenser 1 has a bottom wall 3 with a channel 12 in which the pin 15 travels. The pin 15 which is screwed to the transferring member 2 in aperture 11 is used to limit the travel of the transferring member 2 to maximal forwards and backwards positions. The transferring member 2 is divided into a sliding section 19 and a propelling section 20 which includes also the pressing button 10 that is used for manual operation. When the user presses on the pressing button 10 the transferring member 2 moves forward (i.e. to the left) and moves also the 3 cavities 4 to the left. The transferring member 2 moves into the condiment container 5 via propelling opening 24 and exits via output opening 25. In FIG. 3 the sliding section 19 has 3 cavities 4 which are loading condiment when they reside in the condiment container 5. Cavities 4 are unloading as soon as they are moved outside i.e. beyond the output opening 25. FIG. 3 shows the 3 cavities 4 in an unloading position where they are dropping the condiment outside. The compression spring 14 which is installed between the protrusions 9 is used to push backwards (i.e. to the right) i.e. to retrieve the transferring member 2 after the user pushed the transferring member 2 forwards by pressing the push button 10. In FIG. 3, the compression spring 14 is in compressed state because the transferring member was pushed to the left. The container 5 is supplemented with the condiment via the input opening 26 which is covered by the door 6 in FIG. 2. Hinge apertures 7 are used to install the hinge 8 (shown in FIGS. 1 and 6). The hinge 8 is used as a fulcrum for the door 6 which is installed in the input opening 26. The door handle 13 is used to open the door 6.

Figure 4:
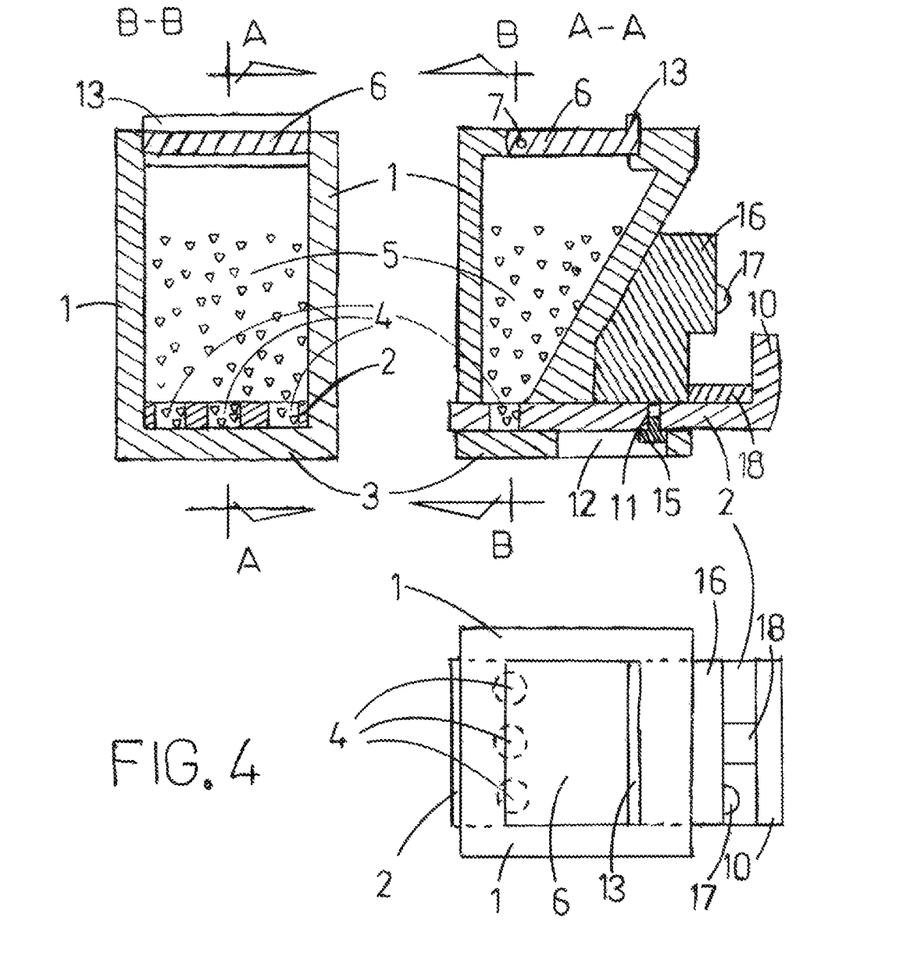
FIG. 4 Describes 3 views of a cross sectioned of an embodiment of a motorized condiment dispenser with its transferring member in a condiment loading position.

FIG. 4 Describes 3 views of a cross sectioned embodiment of a motorized condiment dispenser 1 with transferring member 2 in condiment loading position. The condiment dispenser 1 has a bottom wall 3 with a channel 12 in which the pin 15 travels. The pin 15 which is screwed to the transferring member 2 in aperture 11 is used to limit the travel of the transferring member 2 to maximal forwards and maximal backwards positions. The transferring member 2 is divided into the sliding section 19 and the propelling section 20 which includes also the pressing button 10 which is used for manual operation. When the user activates the activating switch 17 the transferring member 2 moves forward (i.e. to the left) and moves also the 3 cavities 4 to the left. The transferring member 2 moves into the condiment container 5 via propelling opening 24 and exits via output opening 25. In FIG. 4 the sliding section 19 has 3 cavities 4 which are loaded when they reside in the condiment container 5. Cavities 4 become unloaded as soon as they are moved outside i.e. beyond the output opening 25. FIG. 4 shows the 3 cavities 4 in a loading position where they are filled with condiment. The container 5 is supplemented with the condiment via the input opening 26 which is covered by the door 6 in FIG. 4. Hinge apertures 7 are used to install the hinge 8 (shown in FIGS. 1 and 6). The hinge 8 is used as a fulcrum for the door 6 which is installed in the input opening 26. The door handle 13 is used to open the door 6. The power source 16 is connected to the electrical activation switch 17. The electric propelling unit has an electrical motor 22 which is driving the propelling mechanism 23 that has a driving arm 18 that is connected to the propelling section 20 and moves it forwards and backwards when the user activates the switch 17.

Figure 5:
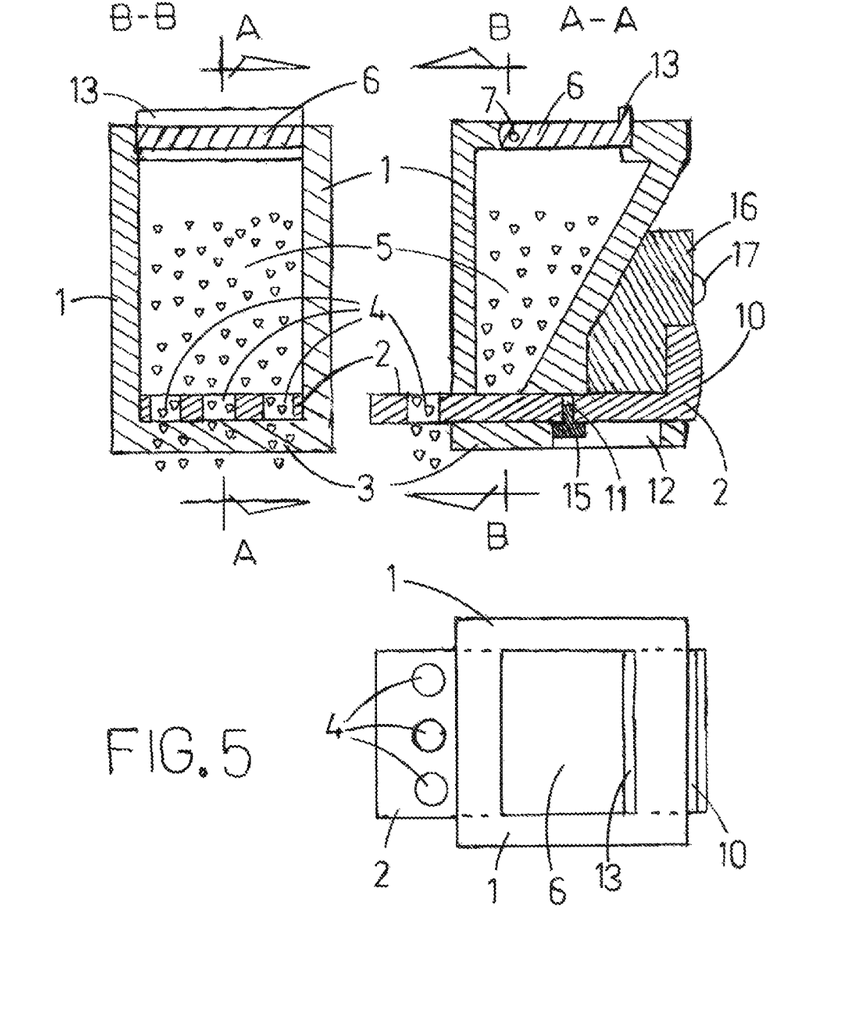
FIG. 5 Depicts 3 views of a cross sectioned an embodiment of a motorized condiment dispenser with its transferring member in a condiment unloading position.

FIG. 5 Depicts 3 views of a cross sectioned a motorized condiment dispenser 1 with a transferring member 2 in condiment unloading position. The condiment dispenser 1 has a bottom wall 3 with a channel 12 in which the pin 15 travels. The pin 15 which is screwed to the transferring member 2 in aperture 11 is used to limit the travel of the transferring member 2 to maximal forwards and maximal backwards positions. The transferring member 2 is divided into a sliding section 19 and a propelling section 20 which includes also the pressing button 10 which is used for manual operation. When the user activates the activation switch 17 the transferring member 2 moves forward (i.e. to the left) and moves also the 3 cavities 4 to the left. The transferring member 2 moves into the condiment container 5 via propelling opening 24 and exits via output opening 25. In FIG. 5 the sliding section 19 has 3 cavities 4 which are loaded when they reside in the condiment container 5 and unloaded when they are outside i.e. beyond the output opening 25. FIG. 5 shows the 3 cavities 4 in an unloading position where they are dropping the condiment outside. The container 5 is supplemented with the condiment via the input opening 26 which is covered by the door 6 in FIG. 5. Hinge apertures 7 are used to install the hinge 8 (shown in FIGS. 1 and 6). The hinge 8 is used as a fulcrum for the door 6 which is installed in the input opening 26. The door handle 13 is used to open the door 6. The power source 16 is connected to the electrical activation switch 17, which is connected to the electrical motor 22. The electric propelling unit has an electrical motor 22 which is driving the propelling mechanism 23 that has a driving arm 18 that is connected to the propelling section 20 and moves it forwards and backwards when the user activates the switch 17.

Figure 6:
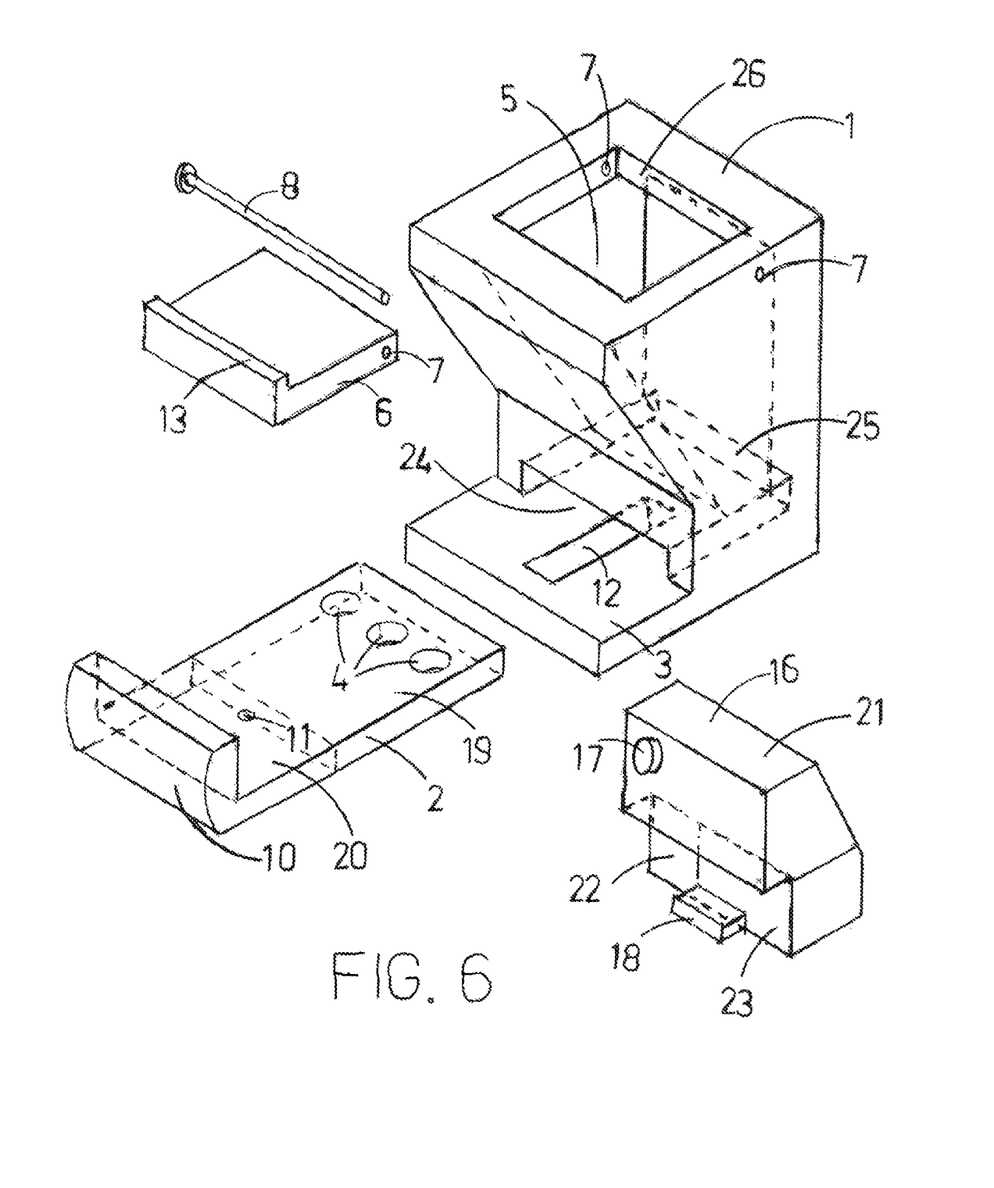
FIG. 6 illustrates a blow up isometric drawing of an embodiment of a motorized condiment dispenser drawing.

FIG. 6 illustrates a blow up isometric drawing of an embodiment of a motorized condiment dispenser. The condiment dispenser 1 has a bottom wall 3 with a channel 12 which is used to limit the travel of the transferring member 2 to maximal forwards and maximal backwards positions. The transferring member 2 is divided into the sliding section 19 and the propelling section 20 which includes also the pressing button 10 which is used for manual operation. When the user activates the activation switch 17 which is connected to the electrical motor 22 which drives the propelling mechanism which in turn propels the driving arm 18 which moves the propelling section 20 forward (i.e. to the right) and propels the sliding section to move also to the right. The transferring member 2 moves into the condiment container 5 via propelling opening 24 and exits via output opening 25. In FIG. 6 the sliding section 19 has 3 cavities 4 which are loaded when they reside in the condiment container 5. The cavities 4 are unloaded and drop their condiment load as soon as they are moved outside i.e. beyond the output opening 25. The container 5 is supplemented with the condiment via the input opening 26 which resides between the hinge apertures 7 which are used to install the hinge 8. The hinge 8 is used as a fulcrum for the door 6 which is installed in the input opening 26. The door handle 13 is used to open the door 6.

The power source 16 is connected to the electrical activation switch 17 that is connected to the electrical motor 22. The electric propelling unit has an electrical motor 22 which is driving the propelling mechanism 23 that has a driving arm 18 that is connected to the propelling section 20 and moves it forwards and backwards when the user activates the switch 17.

What is claimed is:
1. A condiment dispenser comprising of:
a condiment container comprising: a storage space filled with the condiment;
wherein the storage space is confined within: a bottom wall situated at a bottom side of the storage space, a top wall situated at a top side of the storage space, a frontal wall, a rear wall, a left wall and a right wall;
wherein the condiment dispenser further comprising: a transferring member comprising: a sliding section coupled with a propelling section;
wherein the sliding section comprising an upper sliding surface and a lower sliding surface;
wherein the sliding section includes at least one cavity connected to an upper aperture situated at the upper sliding surface; wherein the cavity is also connected to a lower aperture situated at the lower sliding surface;
wherein the condiment container comprising: an input opening and an output opening;
wherein the input opening is situated at the top side of the storage space and is configured to facilitate supplementing the condiment container with the condiment;
wherein the output opening is constructed at the frontal wall and is configured to have an air tight, snug fit with the sliding section;
wherein the output opening connects an inside of the condiment container to an outside of the condiment container;
wherein the sliding section is configured to slide via the output opening to the outside of the condiment container from the inside of the condiment container when propelled forwards by the propelling section;
wherein the sliding section is configured to slide via the output opening to the inside of the condiment container from the outside of the condiment container when propelled backwards by the propelling section;
wherein the condiment is configured to drop into the cavity and load the cavity via the upper aperture when the sliding section is situated such that the upper aperture is in the inside the condiment container;
wherein the condiment which is loaded in the cavity is configured to drop out of the cavity via the lower aperture when the sliding section moves the lower aperture to the outside of the condiment container;
wherein, the condiment dispenser facilitates loading, transferring and dispensing of the condiment when the sliding section moves the cavity from the inside of the condiment container to the outside of the condiment container.
2. The condiment dispenser, of claim 1, comprising:
a propelling opening;
wherein, the propelling opening is constructed at the rear wall opposite to the output opening; wherein the propelling opening is configured to have an air tight snug fit with the propelling section;
wherein the propelling section has an upper propelling surface and a lower propelling surface;
wherein the propelling section is configured to slide via the propelling opening and to propel both forwards and backwards the sliding motion of the sliding section via the sliding opening.
3. The condiment dispenser, of claim 1, wherein the bottom wall has an upper bottom surface which is configured to be planar and smooth;
wherein, the lower sliding surface is configured to slide on top of the upper bottom surface;
wherein, the sliding section resides at the lowest level of the condiment container.
4. The condiment dispenser, of claim 1, wherein the propelling section is propelled manually by a user;

wherein, the user can dispense condiment by propelling the propelling section in alternate forwards and backwards motions, which alternately situate the cavity in the outside of the condiment container and in the inside the condiment container respectively.

5. The condiment dispenser, of claim 1, wherein the propelling section is equipped with a compression spring which retrieves backwards the propelling section after the propelling section was pushed forwards;
wherein, facilitating condiment dispensing by alternate forwards and backwards motions of the propelling section.

6. A condiment dispenser comprising of:
a condiment container comprising: a storage space filled with the condiment;
wherein the storage space is confined within: a bottom wall situated at a bottom side of the storage space, a top wall situated at a top side of the storage space, a frontal wall, a rear wall, a left wall and a right wall;
wherein the condiment dispenser further comprising: a transferring member comprising: a sliding section coupled with a propelling section;
wherein the sliding section comprising an upper sliding surface and a lower sliding surface;
wherein the sliding section includes at least one cavity connected to an upper aperture situated at the upper sliding surface; wherein the cavity is also connected to a lower aperture situated at the lower sliding surface;
wherein the condiment container comprising: an input opening and an output opening;
wherein the input opening is situated at the top side of the storage space and is configured to facilitate supplementing the condiment container with the condiment;
wherein the output opening is constructed at the frontal wall and is configured to have an air tight, snug fit with the sliding section;
wherein the output opening connects an inside of the condiment container to an outside of the condiment container;
wherein the sliding section is configured to slide via the output opening to the outside of the condiment container from the inside of the condiment container when propelled forwards by the propelling section;
wherein the sliding section is configured to slide via the output opening to the inside of the condiment container from the outside of the condiment container when propelled backwards by the propelling section;
wherein the condiment is configured to drop into the cavity and load the cavity via the upper aperture when the sliding section is situated such that the upper aperture is in the inside the condiment container;
wherein the condiment which is loaded in the cavity is configured to drop out of the cavity via the lower aperture when the sliding section moves the lower aperture to the outside of the condiment container;
wherein, the condiment dispenser facilitates loading, transferring and dispensing of the condiment when the sliding section moves the cavity from the inside of the condiment container to the outside of the condiment container;
wherein the condiment dispenser comprising: an electrical power source and an activation switch, which electrically connects the electrical power source to an electric propelling unit which includes an electric motor mechanically connected to a mechanism which is configured to convert the electric motor rotation into alternate forwards and backwards motions of a driving arm which propels the propelling section forwards and backwards;
wherein, an user can dispense condiment by activating the activation switch.

7. The condiment dispenser of claim 1, wherein the input opening includes a door rotatably installed on a hinge at the input opening;
wherein the door is configured to open or to close the input opening;
wherein the door facilitates supplementing the condiment container when the door is open; wherein the door seals the condiment container when the door is closed;
the door comprises a door handle configured to facilitate manual door opening and closing; wherein the hinge is configured to facilitate door turning for opening and closing;
wherein the input opening also comprises a door stopper configured to adjust door closing position.

8. The condiment dispenser of claim 1, wherein the left wall and the right wall are planar, vertical and parallel;
wherein, the sliding section has a sliding width which is configured to occupy the whole space between the left wall and the right wall;
wherein the propelling section has a propelling width which is equal to the sliding width.

9. A condiment dispenser comprising of:
a condiment container comprising: a storage space filled with the condiment;
wherein the storage space is confined within: a bottom wall situated at a bottom side of the storage space, a top wall situated at a top side of the storage space, a frontal wall, a rear wall, a left wall and a right wall;
wherein the condiment dispenser further comprising: a transferring member comprising: a sliding section coupled with a propelling section;
wherein the sliding section comprising an upper sliding surface and a lower sliding surface;
wherein the sliding section includes at least one cavity connected to an upper aperture situated at the upper sliding surface: wherein the cavity is also connected to a lower aperture situated at the lower sliding surface;
wherein the condiment container comprising: an input opening and an output opening;
wherein the input opening is situated at the top side of the storage space and is configured to facilitate supplementing the condiment container with the condiment;
wherein the output opening is constructed at the frontal wall and is configured to have an air tight, snug fit with the sliding section;
wherein the output opening connects an inside of the condiment container to an outside of the condiment container;
wherein the sliding section is configured to slide via the output opening to the outside of the condiment container from the inside of the condiment container when propelled forwards by the propelling section;
wherein the sliding section is configured to slide via the output opening to the inside of the condiment container from the outside of the condiment container when propelled backwards by the propelling section;
wherein the condiment is configured to drop into the cavity and load the cavity via the upper aperture when the sliding section is situated such that the upper aperture is in the inside the condiment container;
wherein the condiment which is loaded in the cavity is configured to drop out of the cavity via the lower aperture when the sliding section moves the lower aperture to the outside of the condiment container;

wherein, the condiment dispenser facilitates loading, transferring and dispensing of the condiment when the sliding section moves the cavity from the inside of the condiment container to the outside of the condiment container;

the condiment dispenser, further comprising: a propelling opening;

wherein, the propelling opening is constructed at the rear wall opposite to the output opening; wherein the propelling opening is configured to have an air tight snug fit with the propelling section;

wherein the propelling section has an upper propelling surface and a lower propelling surface;

wherein the propelling section is configured to slide via the propelling opening and to propel both forwards and backwards the sliding motion of the sliding section via the sliding opening;

wherein the bottom wall includes a channel which is adapted to accept a pin which is screwed at the propelling lower surface;

wherein the pin is configured to travel in the channel along with the propelling section; wherein the pin is configured to prevent the propelling section from exceeding a maximal backwards position and a maximal forwards position.

10. The condiment dispenser of claim 1, wherein the rear wall is configured to be installed in a diagonally leaning backwards orientation in order to facilitate funneling the condiment and concentrating the condiment on top of a narrow lateral strip of the upper sliding surface;

whereby facilitating more efficient condiment loading into the cavity.

11. The condiment dispenser of claim 1, wherein the transferring member is a rectangular bar; wherein the sliding section and the propelling section have the same rectangular cross section.

12. The condiment dispenser of claim 1, wherein the upper sliding surface and the lower sliding surface are smooth.

13. The condiment dispenser of claim 2, wherein the upper propelling surface and the lower propelling surface are smooth.

* * * * *